US006889751B1

United States Patent
Lukas et al.

(10) Patent No.: US 6,889,751 B1
(45) Date of Patent: May 10, 2005

(54) LATENT HEAT STORAGE DEVICE

(75) Inventors: Henry Lukas, Amherst, MA (US);
Charles G. Gasper, Wauwatosa, WI (US); Jeffrey A. Logic, Racine, WI (US); Scott R. Larrabee, Racine, WI (US); C. James Rogers, Racine, WI (US); Mark G. Voss, Franksville, WI (US); Alan P. Meissner, Franklin, WI (US); B. Joseph Fietkiewicz, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 459 days.

(21) Appl. No.: 09/678,990

(22) Filed: Oct. 4, 2000

(51) Int. Cl.[7] .............................................. F28D 19/00
(52) U.S. Cl. ......................... 165/10; 165/136; 165/162; 165/902; 165/906
(58) Field of Search ......................... 165/10, 136, 162, 165/906, 902

(56) References Cited

U.S. PATENT DOCUMENTS

| 1,605,612 | A | * | 11/1926 | Primrose ..................... 165/72 |
| 2,974,404 | A | * | 3/1961 | Humenik, Jr. et al. .. 29/890.034 |
| 4,362,207 | A | * | 12/1982 | Farfaletti-Casali et al. ... 165/10 |
| 4,433,721 | A | * | 2/1984 | Biaggi ........................ 165/162 |
| 4,615,379 | A | * | 10/1986 | Kunzel ........................ 165/10 |
| 4,616,390 | A | * | 10/1986 | MacCracken .......... 29/890.047 |
| 4,807,696 | A | * | 2/1989 | Colvin et al. ................. 165/10 |
| 4,993,481 | A | | 2/1991 | Kamimoto et al. |
| 5,143,148 | A | | 9/1992 | Merryfull |
| 5,255,737 | A | * | 10/1993 | Gentry et al. ............... 165/159 |
| 5,441,097 | A | * | 8/1995 | Kanda et al. ................. 165/10 |
| 5,449,037 | A | * | 9/1995 | Welkey ...................... 165/162 |
| 5,472,047 | A | * | 12/1995 | Welkey ...................... 165/172 |
| 5,642,778 | A | * | 7/1997 | Gentry ........................ 165/162 |
| 6,247,522 | B1 | * | 6/2001 | Kaplan et al. ................ 165/10 |

FOREIGN PATENT DOCUMENTS

| DE | 3245027 | 6/1984 |
| DE | 19619810 | 11/1986 |
| DE | 4036392 | 5/1992 |
| DE | 4100193 | 7/1992 |
| DE | 4109838 | 10/1992 |
| DE | WO9318361 | 9/1993 |
| DE | 4420364 | 12/1995 |
| EP | DE0633154 | 6/1994 |

* cited by examiner

Primary Examiner—Henry Bennett
Assistant Examiner—Nihir Patel
(74) Attorney, Agent, or Firm—Wood, Phillips, Katz, Clark & Mortimer

(57) ABSTRACT

A low volume, high capacity latent heat storage device is achieved in a construction including a salt case (12) with an optional outer jacket (10) surrounding the salt case (12) in spaced relation thereto to define an insulating space (14) between the two. Inlet and outlet conduits (38), (42), (44), (46), extend from the exterior of the outer jacket (10) to the interior of the salt case (12) and at least one tube (20) is located within the salt case and has a plurality of straight, parallel runs (21) defining a matrix with an exterior and a phase change material is sealed within the tube (20). The tube runs (21) inwardly of the matrix exterior are in a regular or equilateral polygonal pattern with each run (21) abutting a plurality of adjacent runs (21) and each run (21) at the exterior of the matrix additionally engaging the salt jacket (12). The runs (21) have cross-sectional shapes such that flow spaces (102, (104) exist between the runs (21) and between the salt jacket (12) as well between adjacent runs (21). The flow spaces (102), (104) are in fluid communication with the inlet and outlet conduits (38), (42), (44), (46).

18 Claims, 3 Drawing Sheets

LATENT HEAT STORAGE DEVICE

FIELD OF THE INVENTION

This invention relates to latent heat storage devices, and more particularly, to a relatively small volume latent heat storage device with a high heat storage capacity.

BACKGROUND OF THE INVENTION

Recent years have seen an increasing demand for latent heat storage devices, particularly in vehicular applications where they are employed as latent heat batteries. A typical latent heat battery typically includes one or more containers of a phase change material (PCM). The PCM absorbs and releases energy in the form of sensible and latent heats, as the material is heated or cooled and/or changes phases between liquid and solid in the heating or cooling process. A typical source of heat is the coolant from a vehicle engine which is flowed about the container of phase change material. When the latent heat battery is charged, the phase change material will be in the liquid phase. Consequently, if cold coolant is circulated about the container of phase change material, the coolant will be warmed as the phase change material is cooled and solidifies, giving up sensible heat and the latent heat of fusion. The now warmed coolant may be utilized to provide relatively instant heat to the interior of the vehicle if passed through the vehicle cab heating system. It may also be utilized to warm the engine and/or transmission to provide for a much faster warm-up than would occur simply through operation of the engine alone.

The latent heat battery, of course, becomes discharged as it warms the coolant and must be recharged. This is accomplished simply by running the coolant through the latent heat battery while the engine is operating a t normal operating temperature. The now hot coolant will warm the phase change material causing it to return to the liquid state from the solid state, absorbing sensible heat and the latent heat of fusion.

In the usual case, one or more containers of a phase change material are disposed within a housing, conventionally referred to as the salt jacket or the inner jacket or the cooling jacket. The salt jacket, in turn, is located in spaced relation, within an outer jacket. Insulating material may be disposed between the interior of the outer jacket and the exterior of the salt jacket. Additionally, a vacuum may be pulled between the two jackets to provide good insulation. The insulating material that may be located in the space between the salt and outer jackets is intended to block heat transfer from the salt jacket to the outer jacket by radiation or to reduce convection when a lesser vacuum is used or as the vacuum deteriorates. Through the use of this insulating technique, the charge on a latent heat battery may be maintained for several days.

While latent heat batteries are not limited to vehicular uses, in vehicular uses, they may be located in any convenient location near the engine compartment. In a current application, the latent heat batteries are located in a recess in the floorboard in the passenger compartment on the floor of the passenger side of the vehicle. Consequently, there is a limited amount of space available for the heat battery. Furthermore, in the general considerations employed in vehicle design, it is highly desirable to make any component as lightweight as possible so as to increase fuel efficiency. Thus, it is highly desirable to make the latent heat battery as small and as lightweight as possible. Minimal size and weight can be achieved by using a PCM with a high total heat capacity (i.e., sensible and latent heat capacity). Generally, merely reducing the size of the latent heat battery is not a sufficient response to the problem. Reducing the size of the battery also reduces its capacity to store heat in that, as the volume of the latent heat battery is reduced, the quantity of PCM that it can accommodate is concomitantly reduced, thereby reducing its heat capacity. Consequently, minimizing weight of the battery will generally be achieved through the use of lightweight materials, such as aluminum.

It is also necessary that salt and outer jackets of the latent heat batteries be structurally reinforced. This is particularly important when a vacuum is pulled in the space between the outer jacket and the salt jacket. Furthermore, since the coolant flowing through the salt jacket is under pressure, a large pressure differential between the inside and outside of the salt jacket is created, causing the salt jacket to tend to deflect outward. Similarly, the outer jacket has a nominal pressure on the outside of one atmosphere and vacuum on the inside, causing the outer jacket to tend to deflect inward. As the salt and outer jackets collapse toward one another, the space between the jackets is reduced. This reduces the insulating ability of the insulating space. Further, as the salt jacket deforms, it in turn may deform the PCM container(s) contained in the salt jacket. Furthermore, every time the vehicle is operated the coolant pressure oscillates between one and two atmospheres as the vehicle heats up. This results in a fatigue cycle being imposed on the PCM container(s). Similarly, the salt and outer jackets must be sufficiently rigid that the jackets do not collapse toward one another reducing the insulating space, thereby reducing the insulating ability of the insulating space, with a consequence that the battery cannot retain a charge as long as might be desired.

Finally, many phase change materials in use today undergo significant volumetric changes in the process of changing from the solid phase to the liquid phase and back. Again, the phase change material containers must have sufficient strength to avoid rupture in response to such volumetric changes.

All of these factors have limited the success of latent heat batteries in vehicular applications, either by posing extreme limits on the latent heat capacity or on the charge that may be placed on the latent heat battery.

In other applications, different problems exist. For example, many types of apparatus require some means of heat rejection to prevent equipment from overheating. One example is in apparatus employing electronics. Heat generated by semi-conductors or chips during their operation must be dissipated to prevent their destruction as a result of overheating. To accomplish this, cooling systems are employed whereby a coolant is flowed in heat exchange relation with the apparatus components requiring cooling. In many types of apparatus the heat load is not uniform. During the course of operation of such equipment, large heat spikes may be generated and the cooling system must be designed to accommodate the heat spikes and reject the heat represented by them.

Heretofore, that has required the use of oversized cooling systems which have sufficient capacity to reject the necessary amount of heat for the highest heat generation encountered during operation of the equipment, i.e., has a cooling capacity to reject the maximum amount of heat that is present as a result of heat spikes. To accomplish this goal, many of these cooling systems are unnecessarily large in order to have the desired heat rejection capacity. This contributes to problems with the sheer size of the cooling system, the use of additional material in forming the components, additional energy costs in operating the cooling system due to the need for large fans and pumps, etc.

The present invention is directed to overcoming one or more of the foregoing difficulties so as to provide a light weight, high capacity, low volume latent heat storage device.

SUMMARY OF THE INVENTION

It is the principal object of the invention to provide a new and improved latent heat storage device. More specifically, it is an object of the invention to provide a latent heat storage device that is ideally suited for, but not limited to, vehicular applications. It is particularly an object of the invention to provide a latent heat battery of low weight, high capacity and low volume in comparison to those presently available.

The invention contemplates a latent heat storage device that includes a salt case with an optional outer jacket surrounding the salt case in spaced relation thereto which may define an insulating space between the salt case and the outer jacket in those applications requiring it. Inlet and outlet conduits extend from the exterior of the outer jacket to the interior of the salt case. At least one salt tube is located within the salt case and defines a plurality of straight, parallel runs, defining a matrix with an exterior. A phase change material is sealed within the at least one salt tube.

According to the invention, an improvement in the latent heat storage device includes tube runs located inwardly of the matrix exterior in a polygonal pattern with each run abutting a plurality of adjacent runs and each run at the exterior of the matrix additionally engaging the salt jacket. The runs have a cross-sectional shape such that flow spaces exist between the runs and between the salt jacket. The flow spaces are in fluid communication with the inlet and outlet conduits.

In one embodiment, each of the runs is defined by an individual tube.

In one embodiment, the polygonal pattern is that of a regular polygon.

In a preferred embodiment the polygon is an equilateral polygon.

In a highly preferred embodiment the equilateral polygon is a regular hexagon.

In a preferred embodiment, each of the tubes is of a circular cross-section.

According to another facet of the invention, a latent heat storage device includes a salt jacket and a surrounding outer jacket as before along with at least one tube within the salt jacket having a plurality of straight, parallel runs defining a matrix along with a phase change material in the tubes.

In this embodiment, the salt jacket includes a plurality of parallel, inwardly directed, spaced, elongated ribs on centers spaced a distance equal to the spacing between the centers of the runs. The runs on the exterior of the matrix are nested between corresponding ones of the ribs and engage the ribs along the respective lengths.

Preferably, the runs are defined by individual tubes of circular cross-section with each tube having six contact points with other adjacent tubes or with the salt jacket on or between the ribs.

It is preferred that the contact points be angularly spaced about the periphery of each tube by about 60°.

In a preferred embodiment, the salt jacket is spaced from the outer jacket by a plurality of stand-offs.

A highly preferred embodiment contemplates that the outer jacket, when used, includes a plurality of strengthening ribs.

In one embodiment, the salt jacket comprises two channel shaped elements surrounding and contacting the matrix and sealed to one another. End plates or caps are located at each end of the matrix and are sealed to the channel shaped elements. They are additionally provided with strengthening ribs.

Other objects and advantages will become apparent from the following specification taken in connection with the accompanying drawings.

DESCRIPTION OF THE PREFERRED EMBODIMENTS

Figure 1:
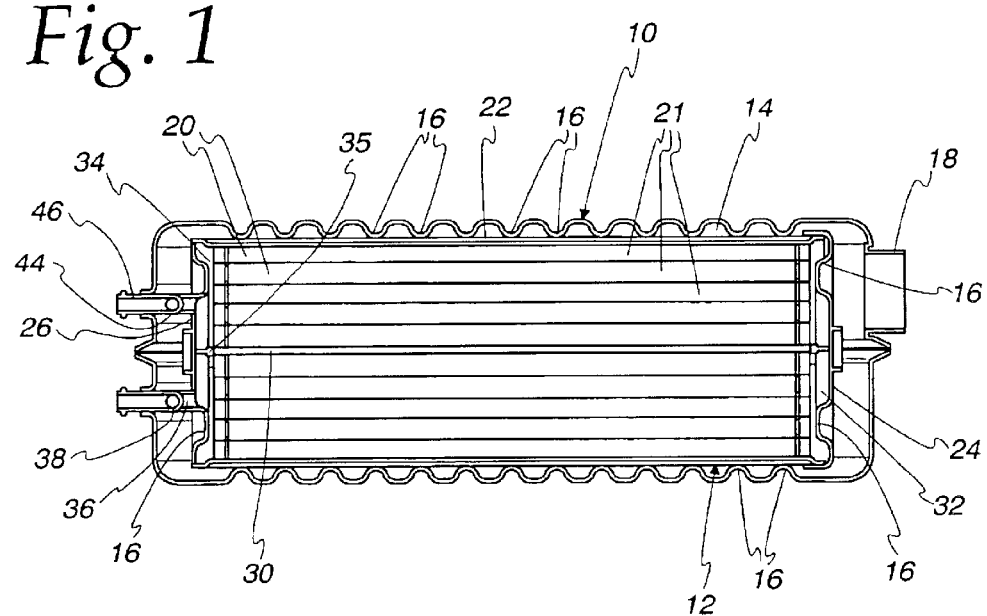
FIG. 1 is a somewhat schematic cross-sectional view of a latent heat storage device made according to the invention.
Figure 2:
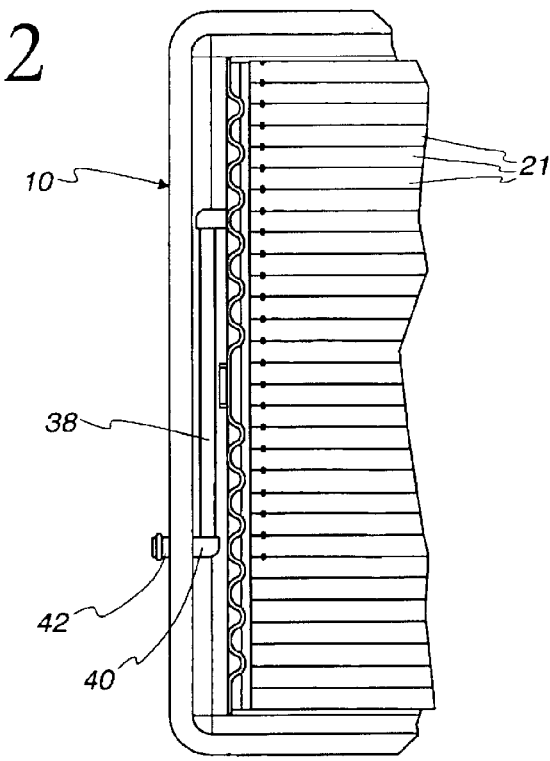
FIG. 2 is a fragmentary, sectional view of one end of the latent heat storage device taken at approximately 90° of FIG. 1.

Referring to FIGS. 1 and 2, a latent heat storage device made according to the invention is illustrated. The same will be described in the context of a vehicular application but it is to be understood that except as insofar as restricted by the appended claims, the same will find application in other uses as well.

The latent heat storage device includes an outer jacket, generally designated 10, which surrounds a salt case or jacket, generally designated 12. The outer jacket 10 is optional but will be employed when the latent heat storage device is used as heat battery. It is spaced from the salt case 12 so as to define an insulating space 14. A plurality of conventional stand-offs 16 extend between the outer jacket 10 and the salt case 12 to provide the desired spacing. The stand-offs are preferably made of a material with poor thermal conductivity.

In the usual case, the space 14 will be subject to a vacuum which may be pulled through a port 18. At the same time, suitable insulating material may be introduced into the space 14 through the port 18. The insulating material will typically be one that insulates against the transmission of convective and radiant energy from the salt case 12 to the outer jacket 10. A suitable insulating material is that sold under the trademark "AEROSOL".

Once the insulating material has been introduced and the desired vacuum achieved, the port 18 may be sealed as by brazing or a welding cap (not shown) thereon.

Within the salt case 12, a plurality of tubes 20 are located. The tubes 20 define a matrix of parallel tube runs 21. In a highly preferred embodiment, the matrix is honeycomb shaped, that is, shaped as a closely packed, equilateral hexagon with an additional tube run 21 in the center. As used herein, the term "regular" refers to a geometric figure, a polygon, whose sides of are equal length and which intersect each other at equal angles. This type of configuration will generally allow the greatest number of tubes 20 to be placed within a salt jacket of a given shape or size. However, in some instances, a polygonal figure other than that of an regular polygon may be employed. For example, and as will be seen hereinafter, where larger flow passages for coolant are desired, or where the overall thickness of the heat battery is desired to be less than would be afforded through the use of a regular polygon such as a regular hexagon, the matrix may have the shape of an "equilateral" polygon which is to say, a polygon whose sides are of equal length but which may intersect each other at the same or differing angles. Each of the tubes 20 is sealed and contains a suitable phase change material which may be of conventional composition. In some cases one or more tubes 20 may be bent upon themselves to define the parallel runs 21 rather than using individual tubes 20.

The salt case 12 includes two outer shells 22 surrounding and abutting the tube runs 21 in a manner to be described. In addition, the shells 22 have their ends closed off by end caps or plates to define a sealed structure. Flow channels to be described are disposed between the tube runs 21 and in the illustrated embodiment, the matrix of tube runs 21 is divided in half by a baffle 30 extending from end to end of the matrix. In some instances, the baffle may be omitted, and in other instances, more than one baffle may be employed for the purpose of changing the number of passes of the coolant through the matrix of tube runs 21.

Adjacent the end cap or plate 24, a flow space 32 is located and is in fluid communication with all of the passages between the tubes 20. On the opposite ends, a somewhat similar flow space 34 is located but in this location, the baffle 30 extends outwardly of the matrix of the tubes 20 and is provided with a gasket, shown schematically at 35, which seals against the end cap or plate 26.

On one side of the baffle 30, the end cap 26 includes an opening 36 to which is connected a conduit 38 disposed in the insulating space 14. The conduit 38 extends to an elbow which in turn receives a hose receiving fitting 42 that extends through a suitable opening in the outer jacket 10.

On the opposite side of the baffle 30, a similar conduit 44 is located and extends to a hose receiving fitting 46. Both of the conduits 38 and 44 are in fluid communication with the interior of the salt case 12 on opposite sides of the baffle 30. Thus, one may serve as an inlet conduit and the other may serve as an outlet conduit for a liquid as, for example, engine coolant. In this embodiment of the invention, the baffle 30 serves to cause the liquid to make two passes through the matrix of the tubes 20. If desired, only a single pass, or a number of passes in excess of two may be employed by respectively eliminating the baffle 30 or utilizing additional baffles 30 and gaskets 35 to increase the number of passes.

Figure 3:
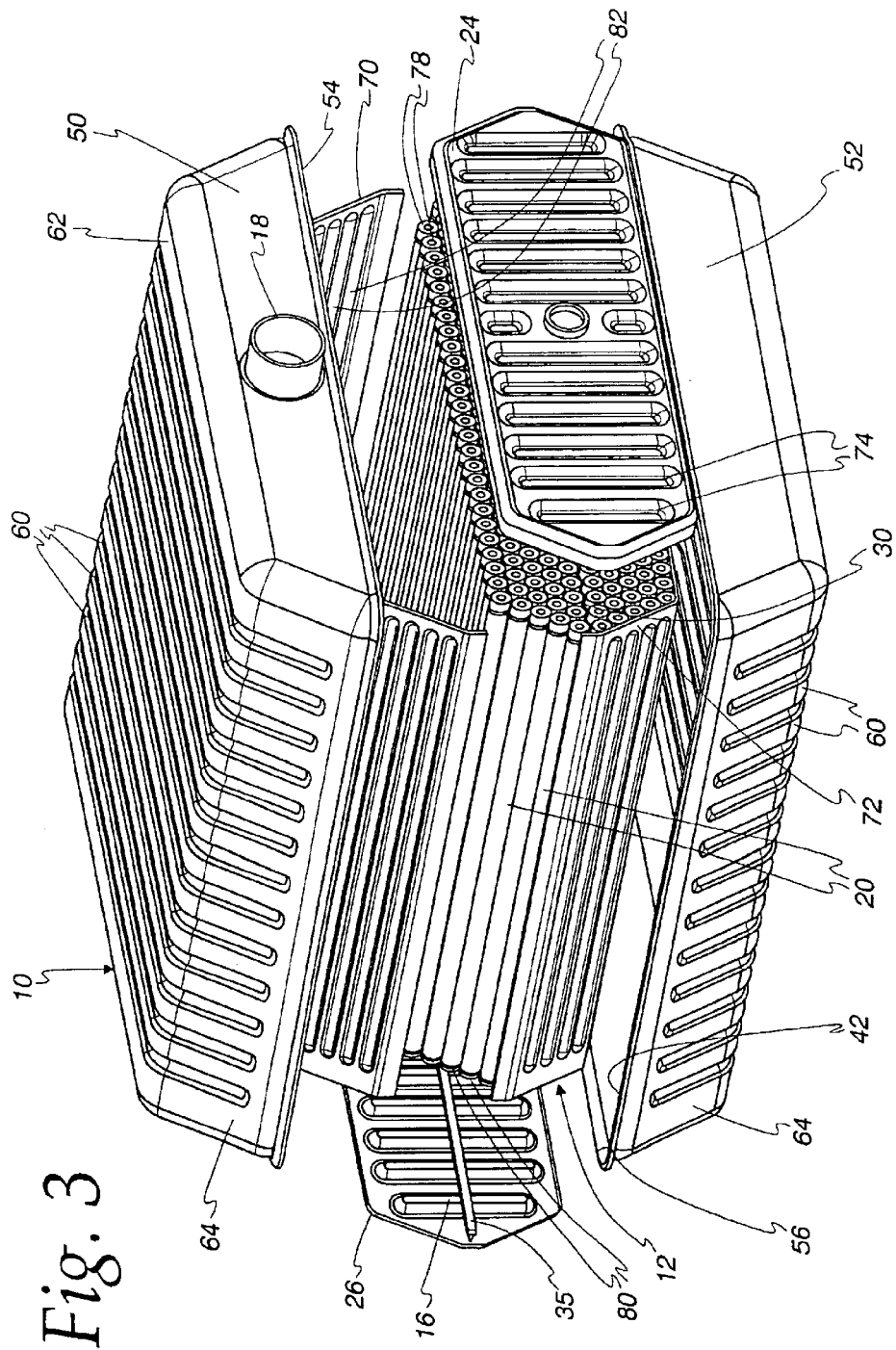
FIG. 3 is an exploded view of the latent heat storage device.

Turning now to FIG. 3, the latent heat storage device will be described in greater detail. As can be seen the outer shell 10 is defined by two, pan-shaped shells, including an upper shell 50 and a lower shell 52. The upper shell 50 includes the port 18 as well as mounts the hose connecting fixture 46 (not shown in FIG. 3) and the lower shell mounts the lower hose connecting fixture 42 which is partially shown in FIG. 3.

The two shells 50 and 52 have peripheral edges 54 and 56 which are brought into abutment with one another and welded together. In addition, each of the shells, 54, 56, includes a plurality of strengthening ribs 60. The strengthening ribs 60 extend generally transverse to the direction of elongation of the tubes 20 and are formed in the bottom 62 of each of the shells 50, 52 as well as in both opposing side walls 64 of the shells 50, 52.

Figure 4:
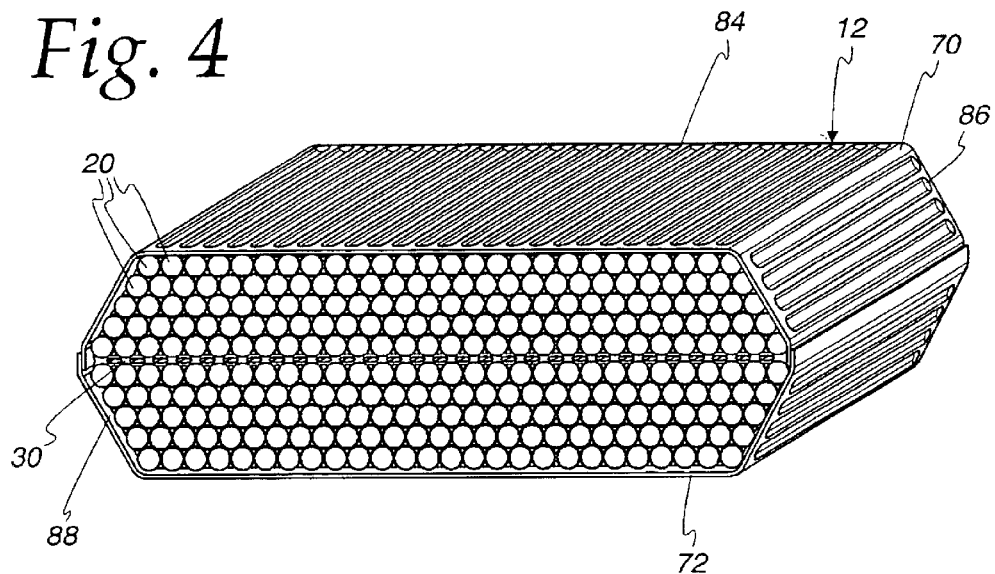
FIG. 4 is a perspective view of the salt jacket or case with the end plates or caps removed.

Referring to FIGS. 3 and 4, the shells making up the salt case include two channel-shaped elements 70, 72 fitted together as illustrated in FIG. 4 and brazed together to captivate the tubes 20 as well as the baffle 30, if used. The arrangement in the illustrated and preferred embodiment is such that the tubes 20 are confined to a closely packed equilateral hexagonal or honeycomb pattern as illustrated with the tubes 20 on the exterior of the matrix contacting the salt jacket assembly 22 as well as other tubes on the interior of the matrix and with the tubes 20 on the interior of the matrix contacting each other and/or the baffle 30, if used.

Fitted to each end of the channels 70, 72 forming the salt case 12 are the end plates or caps 24, 26 as illustrated previously in FIGS. 1 and 2. The cap 24 is seen to include a plurality of inwardly directed strengthening ribs 74 while the end cap or plate 26 includes similar ribs 76.

In actuality, the end plate or cap 24 is a cap which fits about the edges of the channel 70, 72 but which is in spaced relation to the ends 78 of the tubes 20 so as to define the flow space 32 mentioned previously. The end cap or plate 26 is in actuality a plate which is spaced from ends 80 of the tubes 20 and which mounts the gasket 35.

Figure 5:
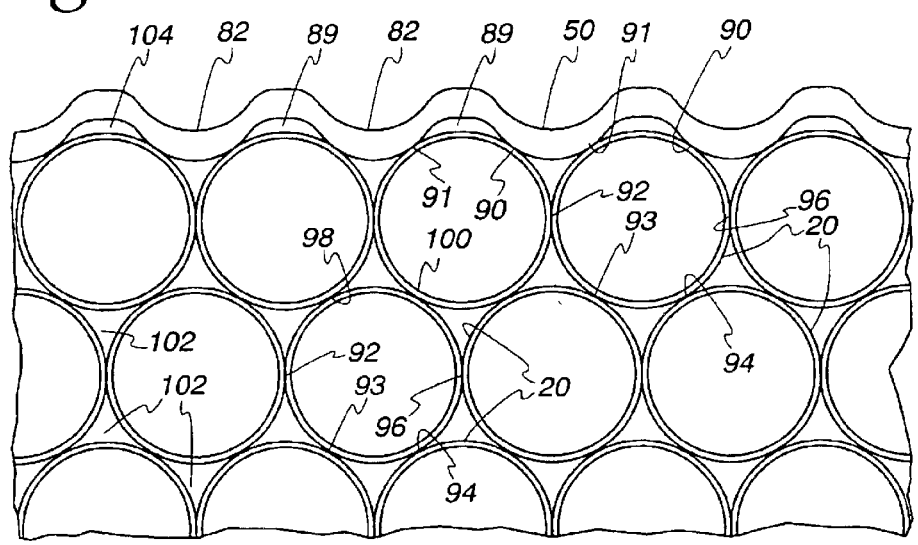
FIG. 5 is an enlarged, fragmentary view of part of the tube matrix.

The channels 70, 72 include a plurality of inwardly directed ribs 82 on the base 84 of each channel as well as both legs 86, 88 thereof. The ribs 82 are spaced on centers that equal the spacing between the centers of the tubes 20 so that the tubes may nest between the space between adjacent ribs 82 as best illustrated in FIG. 5. The ribs are again shown at 82 and the spaces between the ribs are designated 89. It will be observed that the spaces 89 have cross-sections that are generally kidney shaped. As a consequence, each of the tubes 20 on the exterior of the matrix will engage one of two adjacent ribs at a point 90 and the other of the two adjacent ribs at a point 91. The points 90 and 91 are, in fact, lines of contact that extend the entire length of the tubes 20. In addition, a given tube 20 will contact one adjacent tube 20 at a point 92, a second adjacent tube 20 at a point 93, a third adjacent tube 20 at a point 94 and a fourth adjacent tube 20 at a point 96. It will be observed that all of the contact points 90, 91, 92, 92, 93, 94 and 96 are equally angularly spaced by about 60° for the honeycomb or regular hexagonal matrix shown.

In the case of a tube on the interior of a matrix, as seen in FIG. 5, the contact points 90 and 91 with the channels 70, 72 are replaced by contact points 98 and 100 respectively with tubes 20 on the interior of the matrix. Again, the six contact points thus defined are spaced angularly by about 60°.

In a preferred embodiment, the baffle 30 may be made of undulating strips or of a plate-like element having recesses similar to the recesses 82 in the channels 70, 72 so as to achieve the same sort of contact configuration.

As a result of the foregoing, the hoop strength of the tubes 20 is utilized to achieve good pressure resistance from the coolant. Furthermore, regardless of the character of the tube pattern, the approximate equal angular spacing of the contact points between adjacent tubes 20, the salt jacket channels 70, 72 and the baffle 30 improves the stress distribution throughout the matrix and the salt case 12 and is instrumental in increasing the structural strength of the assembly. In particular, this feature of the invention allows the use of relatively thin walled tubes 20 in terms of those heretofore used. Since the walls of the tubes may be made thinner, their inner diameters may be made larger to increase the capacity of each tube in terms of its ability to hold phase change material without increasing the size of the overall matrix. Alternatively, the inner diameter may be unchanged with the result that the lesser wall thickness allows a reduction in the size of the overall matrix. A weight reduction is also present.

Furthermore, the spaces between tubes 20 result in the definition of a plurality of flow paths 102 about the periphery of each tube within the interior of the matrix through which the coolant may flow. In addition, the spaces 89 between the tubes 20 and the ribs 82 result in the formation of flow paths 104 so that even the tubes 20 on the exterior of the matrix are surrounded by six flow paths. Consequently, excellent flow distribution and good heat exchange is achieved. The ribs 82 not only serve to provide the aforementioned distribution of stresses allowing the use of thinner walled tubes, they also provide a strengthening function to resist the pressure of the liquid circulated in the passages 102, 104 as well as forces applied as a result of a vacuum being pulled within the space 14.

From the foregoing, it will be readily appreciated that the unique arrangement and configuration of the tubes 20 in relation to the salt jacket 12 provide a strong unit of minimal volume and/or maximum capacity to hold phase change material. Where capacity must be sacrificed in return for minimizing volume, a latent heat storage device made according to the invention will still have a higher heat capacity or charge than an otherwise equal volume latent heat storage device made according to the prior art because of the ability to use thin walled tubes. At the same time, where heat capacity is to be maximized without increasing volume, the same factor allows that to be achieved. Pressure resistance is provided through the use of tubes as well as the unique arrangement of the ribs in the salt jacket.

While the invention has been described in connection with circular tubes, it will be readily appreciated that tubes having cross-sections other than that of a circular may be employed. For example, one skilled in the art can readily appreciate from FIG. 5 that twelve sided, polygonal tubes could be employed where flat sides are located at the contact points illustrated and additional flat sides located in between the individual contact points. For that matter, tubes of other configurations could be employed with the fluid passages 102, 104 being formed by means of grooves in the exterior of the tubes even when tightly packaged into a closely packed equilateral hexagonal or honeycomb matrix as described.

The foregoing description of the matrix of the tube runs 21, i.e., the foregoing description of a matrix having a closely packed, regular hexagonal or honeycomb pattern, provides for a maximum number of the tube runs 21 in a given space. Where, however, the matrix is to be made thinner, other polygonal patterns may be used. For example, the tube centers may be placed in the corners of an equilateral triangle or a rhombus. On the other hand, when the total cross-sectional area of the flow passages for coolant must be greater than what can be achieved with such a triangular pattern or the previously described honeycomb pattern, the centers of the tube runs 21 may be located on the corners of a square (a regular quadrilateral) or a rhombus (an equilateral quadrilateral). Alternatively, the tubes could be placed on the corners of a regular, non-equilateral hexagon. Of course, many other matrix cross-sectional shapes will occur to those with ordinary skill in the art and the foregoing list is merely representative of how variations in matrix cross-section may be employed to maximize tube density, or maximize coolant flow path cross-section or to achieve a desired balance between the two.

Desirably, however, whatever the shape of the matrix, it should be configured that such that there is cyclically uniform and repeating contact (though not necessarily equal angular spacing between lines of contact, although such is preferred) between adjacent ones of the tubes with each other and with the channels 70, 72 to maximize the structural strength of the system where that is required.

The latent heat storage device may be manufactured generally as follows. The channels 70, 72 are assembled to the matrix of the tubes 20 generally as illustrated in FIG. 4. The assembly may then be brazed together, particularly when aluminum tubes are employed. The tubes 20, after being cooled, may then be filled with the phase change material and sealed in any known way. Thereafter, the end pieces or caps 24, 26 may be welded to the channels 70, 72.

The salt jacket 12 may then be mounted into the shells 50, 52 comprising the outer jacket, inlet and outlet (coolant) conduits are connected and welded in place. Then, using the port 18, the space 14 is evacuated and filled with an insulating material. While under vacuum, a sealing plate (not shown) may be employed to close the port 18. Thus, assembly is relatively simple as well.

Thus, one with ordinary skill in the art will readily appreciate that a latent heat storage device made according to the invention achieves the foregoing objects set forth above and is ideally suited for use as a heat battery in vehicular applications.

Of course, the latent heat storage device described above may find use as a heat battery in non-vehicular applications as well. Moreover, the same may be utilized as a thermal capacitor to allow a minimization of the size of cooling systems in apparatus subjected to varying heat loads, i.e., where heat spikes are present during operation of the apparatus.

For example, in electronic cooling applications as alluded to previously, the latent heat storage device may be located in the cooling system downstream of the heat load and upstream of the heat exchanger utilized to reject heat to the ambient or an other media. In such a case, the latent heat storage device may act as a thermal capacitor to smooth out the heat spikes encountered as a result of the operation of the apparatus to be cooled. In this regard, the latent heat storage device will be configured in the cooling system in such a way that when heat spikes are not present, the latent heat storage device will reject heat to the coolant flowing through it from the load to the heat rejection heat exchanger. When a heat spike is encountered, the heat represented by the spike will be absorbed in the latent heat storage device during the occurrence of the spike. As soon as the spike has passed, the stored energy will be discharged or rejected into the coolant stream upon continuing operation of the device. As a consequence, overly large pumps to circulate a large volume of coolant sufficient to accommodate the heat spike may be avoided. Similarly, the heat rejection heat exchanger need be sized only slightly larger than required to reject the heat during system operation when a heat spike is not present. The size of a fan, if used in connection with the heat rejection heat exchanger may be similar downsized. As a consequence, the volume of the cooling system in terms of its physical size as well as its cost may be substantially reduced.

Of course, when used as a thermal capacitor, the latent heat storage device, from the functional standpoint, will not normally require the presence of the outer jacket and the insulating space for the outer jacket 10 and insulating space 14 it defines in connection with the salt case 12. Indeed, its omission may allow an additional measure of heat rejection from the exterior surface of the salt case 12.

At the same time, in many applications, the outer jacket 10 may be maintained along with certain amount of insulation space for the purpose of preventing the latent heat storage battery from rejecting heat to its surroundings in a way that might cause adjacent equipment to be overheated or to prevent exposure of an overly high temperature surface to the surroundings for any of a variety of reasons.

We claim:

1. In a latent heat storage device including a salt case, inlet and outlet conduits extending to the interior of the salt case, at least one tube within the salt case and having a plurality of elongated straight parallel runs defining a matrix with an exterior, and a phase change material sealed within said at least one tube, the improvement wherein the runs are laid out in an equilateral polygonal pattern with each run inwardly of said matrix exterior abutting a plurality of adjacent runs and each run at the exterior of said matrix additionally engaging said salt case, said runs having a cross-sectional shape such that flow spaces exist between said runs between their points of abutment with others of said runs and said salt case, said flow spaces being in fluid communication with said inlet and outlet conduits.

2. The latent heat storage device of claim 1 wherein each of said runs is defined by an individual tube.

3. The latent heat storage device of claim 1 wherein each of said tubes is of circular cross-section.

4. The latent heat storage device of claim 1, wherein said tubes are brazed together to form a tube matrix.

5. The latent heat storage device of claim 1, wherein said tubes are brazed together and to the inner wall of said salt case in a pattern of brazed connections that are cyclically uniform and repetitive.

6. The latent heat storage device of claim 1 wherein said regular polygonal pattern is a closely packed hexagonal pattern.

7. The latent heat storage device of claim 6 wherein said runs are circular in cross-section, each of said runs having six contact points with other runs or said salt case, there being one of said flow spaces between each pair of adjacent ones of said contact points.

8. The latent heat storage device of claim 7 wherein said salt case includes a plurality of parallel, elongated, inwardly directed spaced ribs, said runs having spaced centers, the spacing between said ribs being the same as the spacing between said centers, the runs on said matrix exterior being nested between two adjacent ribs and each having one of said contact points with each of said two adjacent ribs.

9. The latent heat storage device of claim 1 further including a baffle extending through said matrix between said runs; said inlet conduit being connected to said salt case on one side of said baffle, said outlet conduit being connected to said salt case on the other side of said baffle.

10. The latent heat storage device of claim 1 further including an outer jacket surrounding said salt case in spaced relation to define an insulating space between said salt case and said outer jacket, said inlet and outlet conduits extending from the exterior of the outer jacket to the interior of the salt case.

11. In a latent heat storage device including a salt case, inlet and outlet conduits extending to the interior of the salt case, at least one tube within the salt case and having a plurality of straight parallel runs defining a matrix with an exterior, and a phase change material sealed within said at least one tube, the improvement wherein the runs are in an equilateral polygonal pattern with each run inwardly of said matrix exterior abutting a plurality of adjacent runs and each run at the exterior of said matrix additionally engaging said salt case, said runs having a cross-sectional shape such that flow spaces exist between said runs, said flow spaces being in fluid communication with said inlet and outlet conduits, said salt case including a plurality of parallel, inwardly directed, spaced, elongated ribs on centers spaced a distance equal to the spacing between the centers of said runs, said runs on the exterior of said matrix being nested between corresponding ones of said ribs and engaging said ribs along their respective lengths.

12. The latent heat storage device of claim 11 wherein said runs are defined by individual tubes of circular cross-section, and said equilateral polygonal pattern is a regular, hexagonal pattern, each tube having six contact points with other adjacent tubes or with said salt case on and between said ribs.

13. The latent heat storage device of claim 12 wherein said contact points are angularly spaced about the periphery of each tube by about 60°.

14. The latent heat storage device of claim 11 including an outer jacket surrounding said salt case in spaced relation to define an insulating space and said salt case is spaced from said outer jacket by a plurality of standoffs.

15. The latent heat storage device of claim 11 wherein said outer jacket includes a plurality of strengthening ribs.

16. The latent heat storage device of claim 15 wherein said salt case comprises two channel shaped elements surrounding and contacting said matrix, and sealed to one another, and end plates or caps at each end of said matrix and sealed to said channel shaped elements, said end plates or caps being provided with strengthening ribs.

17. The latent heat storage device of claim 11 wherein said salt case comprises two channel shaped elements surrounding and contacting said matrix, and sealed to one another, and end plates or caps at each end of said matrix and sealed to said channel shaped elements, said end plates or caps being provided with strengthening ribs.

18. In a latent heat battery including a salt case, an outer jacket surrounding said salt case in spaced relation thereto to define an insulating space between the salt case and the outer jacket, inlet and outlet conduits extending from the exterior of the outer jacket to the interior of the salt case, at least one tube within the salt case and having a plurality of straight parallel runs defining a matrix with an exterior, and a phase change material sealed within said at least one tube, the improvement wherein the runs are laid out in an equilateral polygonal pattern with each run inwardly of said matrix exterior abutting a plurality of adjacent runs and each run at the exterior of said matrix additionally engaging said salt case, said runs having a cross-sectional shape such that flow spaces exist between said runs between the points of abutment of said runs and between the points of abutment of said runs and said salt case, said flow spaces being in fluid communication with said inlet and outlet conduits.

\* \* \* \* \*